United States Patent [19]

Selga

[11] Patent Number: 5,004,144
[45] Date of Patent: Apr. 2, 1991

[54] REUSABLE FABRIC GIFT WRAP

[76] Inventor: Betty J. Selga, 4859 Briercrest Ave., Lakewood, Calif. 90713

[21] Appl. No.: 404,821

[22] Filed: Sep. 8, 1989

[51] Int. Cl.$^5$ .............................................. B65D 65/06
[52] U.S. Cl. ................................ 229/87.190; 40/312; 40/630; 40/638; 206/457; 206/521; 229/87.02; 229/923; 383/4; 428/4
[58] Field of Search ............ 229/87 R, 40, 923, 87.19, 229/87.02; 206/457, 472, 424, 525, 521; 224/901; 40/312, 638, 360, 629, 642, 630; 428/4; 383/4, 99

[56] References Cited

U.S. PATENT DOCUMENTS

| | | | |
|---|---|---|---|
| 248,353 | 10/1881 | Schilling | 40/312 |
| 1,190,148 | 7/1916 | Goewey | 229/87 R X |
| 1,291,480 | 1/1919 | Gore | 383/99 |
| 1,385,695 | 7/1921 | MacCormack | 383/4 X |
| 1,822,899 | 9/1931 | Malis | 206/521 |
| 2,584,254 | 2/1952 | Brodbeck | 40/312 |
| 2,655,260 | 10/1953 | Clerc | 40/312 |
| 2,861,680 | 11/1958 | Frasch | 229/87 R |
| 3,144,935 | 8/1964 | Geyler | 229/901 X |
| 3,355,092 | 11/1967 | Le Pain | 229/87 R |
| 3,366,313 | 1/1968 | Culberg et al. | 229/87 R |
| 3,381,889 | 5/1968 | Laskow | 229/87 R |
| 3,623,526 | 11/1971 | Robertson | 229/87 R X |
| 3,683,987 | 8/1972 | Robertson | 383/99 |
| 3,829,008 | 8/1974 | Murray et al. | 229/87 R |
| 4,106,126 | 8/1978 | Traenkle | 428/4 X |
| 4,562,952 | 1/1986 | Chinmar | 229/87 A |
| 4,566,592 | 1/1986 | Klukos | 206/232 X |
| 4,614,266 | 9/1986 | Moorhead | 40/312 X |
| 4,726,509 | 2/1988 | Fonas | 428/4 X |

FOREIGN PATENT DOCUMENTS 166627  1/1934  Switzerland ........................... 428/4

Primary Examiner—Bryon P. Gehman
Attorney, Agent, or Firm—Charles H. Thomas

[57] ABSTRACT

A reusable gift wrapping is comprised of a flexible expanse of folding fabric having releasable Velcro fasteners secured to its periphery. The Velcro fasteners are engagable when the farbic is folded to envelop a carton placed within the expanse of foldable fabric. A fabric bow and a fabric card holder may also be removably attached to the expanse of foldale fabric ny means of Velcro fasteners.

10 Claims, 2 Drawing Sheets

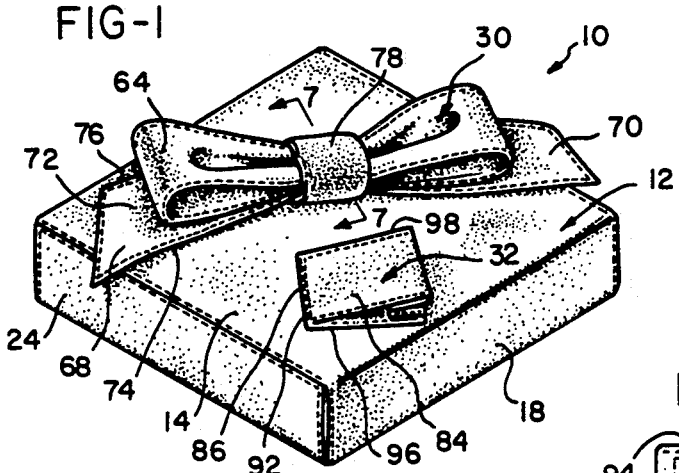
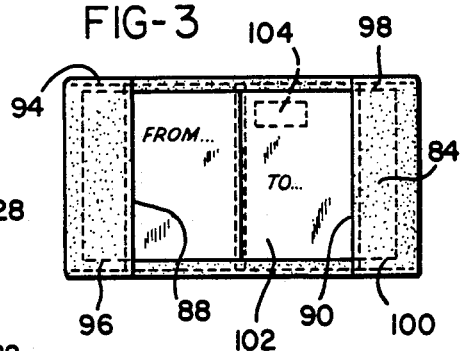
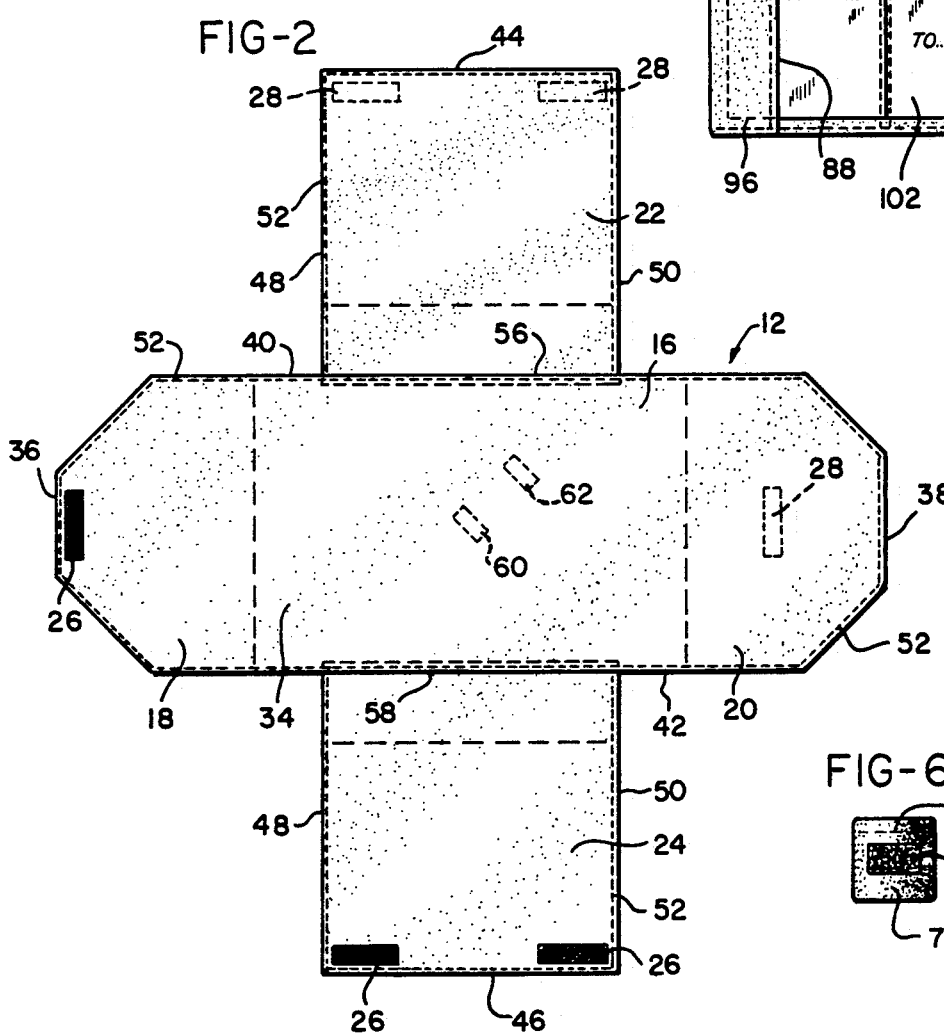
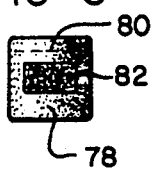

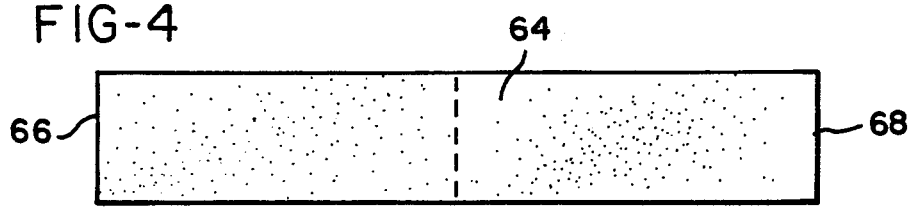
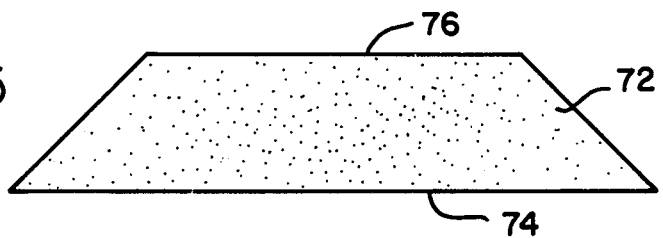
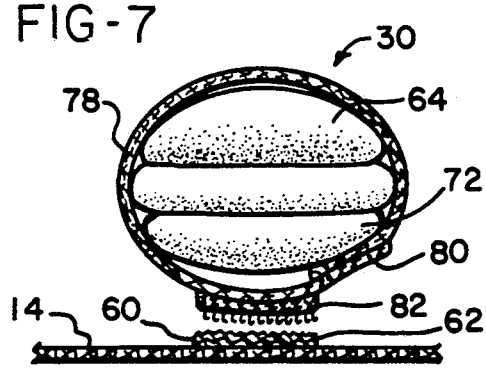
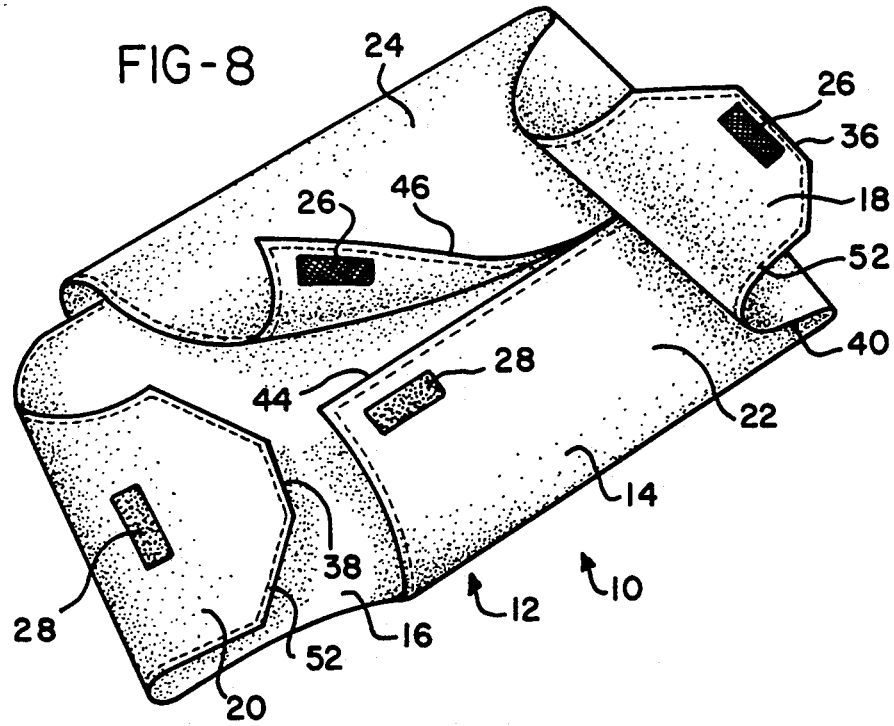

REUSABLE FABRIC GIFT WRAP

BACKGROUND OF THE INVENTION

1. Field of the Invention

The present invention relates to a reusable fabric gift wrapping.

2. Description of the Prior Art

For many years gifts in many different societies have been wrapped in wrapping paper. The wrapping paper is often decorated with designs or patterns indicative of the occasion for which the gift is given. The wrapping paper serves as a cheerful decoration for the gift and also as a means for temporarily concealing the gift from observation by the intended recipient.

Conventional gift wrap is designed for a single use, and is usually formed of paper, although plastic and foil gift wrap are also available. When a gift wrapped in conventional wrap is opened, the wrapping almost invariably is ripped and torn. The torn gift wrapping is then normally destroyed or discarded.

The conventional practice of employing disposable gift wrapping is extremely wasteful. Many tons of paper are consumed annually in the production of disposable gift wrapping paper. The production of gift wrapping paper requires the destruction of many acres of timber annually, thus placing an unnecessary drain on limited resources of forest products.

The disposal of conventional gift wrapping paper also creates significant environmental problems. Much of the conventional disposable gift wrapping that is consumed is burned, thereby unnecessarily adding to the amount of smoke and carbon dioxide in the atmosphere. In recent years it has become apparent that the excessive production of carbon dioxide, coupled with the destruction of natural forest land is creating significant environmental problems. Specifically, the rise in the level of carbon dioxide in the earth's atmosphere is creating a green house effect which is adversely affecting the environment.

SUMMARY OF THE INVENTION

The primary object of the present invention is to provide a reusable fabric gift wrapping as a replacement for conventional disposable gift wrapping. The use of such a reusable fabric gift wrapping avoids the necessity for continued use of forest products for the production of disposable gift wrapping, and also eliminates the environmental problems created by the disposal of conventional paper gift wrapping.

A further object of the invention is to reduce the large expenses which are incurred in purchasing disposable gift wrapping paper. The reusable fabric gift wrapping of the invention is preferably formed of a cheap but sturdy fabric, such as cotton. Cotton is light in weight, relatively easy to produce and is readily washable. The fabric gift wrapping of the invention can be used over and over again for many years. Should the fabric gift wrapping become soiled with food or other material, it can be easily washed and returned to its original attractive condition.

A further object of the invention is to provide a neat, attractive gift wrapping to produce aesthetically pleasing gift wrapped packages. This is especially useful for people who have difficulty wrapping gifts. The expansive fabric wrap may be constructed with different dimensions so as to snugly envelop standard sizes of cartons and boxes, as well as non-standard sizes. The flexible fabric gift wrap of the invention employs releasable fasteners in the form of flexible hook and loop fabric fastening contact strips. Pairs of mutually interengageable mating contact strips of hook and loop fasteners are sold commercially under the registered trademark Velcro.

In one broad aspect the present invention is a reusable article for enveloping gifts comprising an expansive fabric wrap adapted to receive a gift therein, and releasable flexible fabric hook and loop fastening means secured to the fabric wrap for holding the fabric wrap to encase the gift therewithin.

In another broad aspect the present invention is a reusable gift wrapping comprising a flexible expanse of foldable fabric having releasable fastening means secured to its periphery. When the fabric is folded to envelop a carton placed therewithin, the fastening means are engagable.

The reusable fabric gift wrapping of the invention can be formed of numerous different fabric materials such as dacron, rayon and polyester, although cotton is preferable for reasons of ease of care and economy. The fabric wrap may be formed of smooth fabric sheets, or it may be quilted to add extra protection for fragile gifts and reversibility for separate occasions. Preferably the fabric wrap is provided with a fabric bow and a fabric card holder, both of which are attached to the top of the exposed surface of the expansive fabric wrap by releasable fasteners.

The expansive fabric wrap may be printed with designs indicative of particular holidays or occasions upon which gifts are given, such as Christmas, Easter, Valentine's Day, birthdays, Mother's Day, Father's Day, anniversaries, weddings, baby showers, as well as other occasions. Also, the fabric wrap may be printed with juvenile prints for gifts to children or in more formal styles. Alternatively, the fabric may be printed with a pattern suitable for use on many different occasions.

The reusable gift wrapping of the invention preferably includes reusable fabric bows and cardholders which may be releasably attached to the expanse of foldable fabric. The fabric bows and card holders may either be printed to match the fabric wrap or they may be produced in contrasting colors or patterns. The fabric bows and card holders of different reusable wrappings may be employed interchangeably with each other to create a variety of wrapping combinations.

The flexible hook and loop fasteners employed in the invention are comprised of a plurality of a first type of fastening strips each having a contact surface bearing a multiplicity of outwardly projecting flexible hooks, and a plurality of a second type of fastening strips each having a contact surface bearing a flexible looped pile. The contact surfaces of the first type of fastening strip are sewn onto the expansive fabric wrap at locations such that they are positioned in juxtaposition with the contact surfaces of the second type of fastening strips when the fabric wrap envelops a package to be wrapped. The hooks are releasably engageable in the pile when the mating contact strips are pressed together. To open the fabric wrap the mating contact strips are merely peeled apart to separate the flaps of the fabric wrap.

The invention may be described with greater clarity and particularity with reference to the accompanying drawings.

DESCRIPTION OF THE DRAWINGS

FIG. 1 is a perspective view of a preferred embodiment of the invention in use to envelop a gift.

FIG. 2 is a plan view of the foldable expansive fabric wrap employed in the article of FIG. 1.

FIG. 3 is a plan detail showing the construction of the fabric card holder employed in the article of FIG. 1.

FIG. 4 is a plan view of one fabric strip employed to form the bow of the article of FIG. 1.

FIG. 5 is a plan view of another fabric strip employed in conjunction with the strip of FIG. 4 to form the bow of the article depicted in FIG. 1.

FIG. 6 is a view of a fabric band, shown in isolation, and employed to form the bow of the article depicted in FIG. 1.

FIG. 7 is a sectional elevational detail taken along the lines 7—7 of FIG. 1.

FIG. 8 shows the manner in which the flaps of the expansive fabric wrap of FIG. 2 are juxtaposed together.

DESCRIPTION OF THE EMBODIMENT

FIG. 1 illustrates a reusable gift wrapping 10 comprising a flat expanse of fabric 12 having an outer exposed surface 14 and an opposite inner concealed surface 16, visible in FIG. 2. The expanse of fabric 12 has sets of pairs of foldable flaps. One of these pairs includes the flaps 18 and 20, while the other pair includes the flaps 22 and 24. As illustrated in FIG. 2, the flaps in each pair are directed in mutually opposing directions. Also, the flaps in each pair are equipped with mutually engagable hook and loop fastener means comprised of pairs of mating strips 26 and 28. The reusable gift wrapping 10 also includes a fabric bow 20 and a fabric card holder 32.

As illustrated in FIG. 2, the flexible expanse of fabric 12 is formed as a cruciform having four outwardly directed foldable flaps 18, 20, 22 and 24. The flaps 18 and 20 are formed in a pentagonal configuration. To accommodate a box or carton that is shaped as a rectangular prism measuring eight inches by eight inches by two inches, the expanse of fabric 12 can be constructed of three separate fabric sheets. The first sheet forms the pair of end flaps 18 and 20 and the central body 34 of the expanse-of fabric 12. The remote edges 36 and 38 of the end flaps 18 and 20 are located twenty five and one half inches apart, and the transverse edges 40 and 42 of the fabric sheet forming the end flaps 18 and 20 and the central body 34 are eight and one quarter inches apart. The edges 36 and 38 are each two inches long, and the extremities of the flaps 18 and 20 are tailored with cuts of forty five degree relative to both the remote edges 36 and 38 and the transverse edges 40 and 42.

Two separate rectangular sheets of fabric are attached to the central body 34 by stitched inner seams 56 and 58 to form the opposing end flaps 22 and 24. The opposite edges 44 and 46 of the flaps 22 and 24 are located twenty two inches apart, while the transverse edges 48 and 50 thereof are located eight and one half inches apart. The expanse of fabric 12 is further comprised of overlock stitches of thread 52 extending about the entire perimeter of the fabric wrap 12.

The contact strips 26 are each formed of male Velcro pads one half of an inch in width by two inches in length. The male Velcro pads 26 each bear a multiplicity of minute flexible hooks that project therefrom. The male pads 26 are located on the inner or concealed surface 16 of the expanse of fabric 12 near the edges 36 and 46 of the flaps 18 and 24, respectively, as illustrated in FIG. 2.

Three contact strips 28, each formed of a female Velcro pad one half inch in width and two inches in length, are sewn to the exposed surface 14 of the expanse of fabric 12. Two or the pads 28 are located at the opposite outer corners of the flap 22 near the edge 44 thereof. The other female Velcro pad 28 is located in the interior of the flap 20 on the outer exposed surface 14 of the expanse of fabric 12.

There are two other female Velcro contact strips 60 and 62 located on the outer exposed surface 14 of the expanse of fabric 12. The contact strip 60 is located at the center of the central body 34, while the contact strip 62 is spaced from the contact strip 60 a distance of one and one half inches, measured center to center. The female Velcro strips 60 and 62 are used, respectively, to releasably secure the card holder 32 and the bow 30 to the exposed surface 14 of the fabric expanse 12.

The construction of the bow 30 is illustrated in FIGS. 4-7. The bow 30 is comprised of a fabric strip 64, depicted in FIG. 4, which is three and one quarter inches in width and eighteen and one half inches in length. The side edges of the fabric strip 64 are sewn with overlock stitching. The ends 68 and 70 of the bow 30 are formed by a single trapezoidal shaped strip 72 of fabric, depicted in FIG. 5. The strip 72 is three inches in width. The longer longitudinal edge 74 of the strip 72 is fourteen inches in length, while the shorter longitudinal edge 76 is eight inches in length. The strip 72 is sewn about its perimeter with overlock stitching. The bow 30 also includes a fabric strip 78, depicted in isolation in FIG. 6, the perimeter of which is sewn with overlock stitching. A contact strip in the form or a mating Velcro pad 82 measuring one inch by one half inch is sewn onto the underside of the fabric strip 78 and is visible in FIG. 6.

To create the bow 30, the opposite transverse edges 66 and 68 of the fabric strip 64 are brought together so that the fabric strip 64 is formed into a loop. The ends of the fabric strip 64 are then sewn together by a transverse line of stitching proximate to the transverse edges 66 and 68 using a one quarter inch seam. The loop is then flattened with the transverse seam near its center and on its underside. The flattened, elongated loop formed by the fabric strip 64 is placed atop the trapezoidal shaped strip 72 at the center thereof and extending parallel thereto The fabric strips 64 and 72 are then pinch pleated together. The strip 78 is then centered along the lengths of the fabric strips 64 and 72, and wrapped about them. The ends of the strip 78 are then sewn together so that the strip 78 forms a band about the shaped fabric strips 64 and 72. The strips 64, 72 and 78 thereupon form the bow 30, as depicted in FIG. 1.

The bow 30 is held to the outer exposed surface 14 of the expanse of fabric 12 by interengagement of the minute flexible fabric hooks of the male Velcro contact strip 82 in the looped pile of the female Velcro contact strip 62, as best depicted in FIG. 7. Bows 30 of different colors or configurations may be employed interchangeably with the expanse of fabric 12 for variety, if desired.

The construction of the card holder 32 is depicted in FIG. 3. The card holder 32 is formed of a single rectangular length of fabric 84. The fabric strip 84 is three and three quarter inches in width as measured along the edges 88 and 90. The ends of the rectangular strip 84 are folded over inwardly about one and one quarter inches and stitched at 94, 96, 98 and 100 to form a pair of pockets at both ends. The openings of the pockets are formed by the shorter edges 88 and 90 of the fabric strip 84. The pockets serve to capture the edges of a folding paper card 102 therewithin.

A male Velcro pad 104 one half inch in width and one inch in length is sewn to the underside of the fabric strip 84 for releasable engagement with the female Velcro pad 60 on the outer surface 14 of the expanse of fabric 12. The fabric strip 84 is folded at its center to form a dihedral, visible in FIG. 1. The fold 86 is parallel to the shorter edges 88 and 90 of the rectangular strip 84. The fold 86 is sewn with a line of overlock stitching 92 to hold the card holder 32 in a normally closed position, as illustrated in FIG. 1.

To use the reusable fabric gift wrap 10, the expanse of fabric 12 is first placed with its side 14 facing downwardly and the inner side 16, which is ultimately concealed, facing outwardly, as depicted in FIG. 2. A box containing a gift to be wrapped is then placed onto the inner surface 16 of the central body 34 of the expanse of fabric 12. The flap 22 is then folded over the box. The flap 24 is then pulled taut and likewise wrapped from the opposite direction over the box and in lapping relationship over the edge 44 of the flap 22, as depicted in FIG. 8. The hook type male contact strips 26 at the corners of the flap 24 are thereupon pressed against the female contact strips 28 to releasably secure the flaps 22 and 24 together.

The flap 20 is then folded over the box, and the flap 18 is wrapped over the box from the opposite direction and in lapping relationship relative to the edge 38 of the flap 20. The male Velcro contact strip 26 on the surface 16 of the flap 18 is then pressed against the female Velcro contact strip 28 on the outer exposed surface 14 of the flap 20. The package is then turned over into the position depicted in FIG. 1 so that all of the flaps are on the underside. The bow 30 is then releasably secured on the central body 34 of the expanse of fabric 12 by mutual interengagement of the contact strips 82 and 62. The card holder 32 is then attached to the expanse of fabric 12 by mutual interengagement of the contact strips 104 and 60.

As illustrated in FIG. 1, the reusable fabric gift wrapping article of the invention forms an aesthetically pleasing gift wrapping. When not in use the fabric gift wrap 10 can be stored in a flattened and folded condition for later reuse. Should the wrapping 10 become soiled or dirty after prolonged use, it can be readily washed in a conventional washing machine.

Undoubtedly, numerous variations and modifications of the invention will become readily apparent to those familiar with gift wrapping. Accordingly, the scope of the invention should not be construed as limited to the specific embodiments thereof depicted and described herein, but rather is defined in the claims appended hereto.

I claim:

1. A reusable article for enveloping gifts comprising an expansive quilted fabric wrap having opposite surfaces and having overlock stitches of thread extending about its entire perimeter wherein said surfaces are reversible and when unfolded said wrap is adapted to receive a gift therein and defines a cruciform having two pairs of outwardly directed foldable flaps, the flaps in each pair being directed in mutually opposite directions and the pairs of flaps residing in mutually perpendicular disposition when said flaps are unfolded, and releasable flexible hook and loop fastening means are secured to each of said pairs of flaps of said fabric wrap for holding said fabric wrap shut to encase said gift therewithin with one of said opposite surfaces selectively and alternatively disposed as an outer exposed surface and with the other of said opposite surfaces selectively and alternatively disposed as an inner concealed surface.

2. A reusable article according to claim 1 wherein said flexible hook and loop fastening means is comprised of a plurality of a first type of fastening strips each having a contact surface bearing a multiplicity of outwardly projecting flexible hooks and a plurality of a second type of fastening strips each having a contact surface bearing a flexible looped pile, and said contact surfaces of said first type of fastening strips are positionable in juxtaposition with said contact surfaces of said second type of fastening strips, whereby said hooks are releasably engageable in said pile.

3. A reusable article according to claim 1 further comprising a bow made from fabric and releasable hook and loop fastening means sewn onto said bow and onto said fabric wrap for releasably securing said bow to said wrap.

4. A reusable article according to claim 1 further comprising a card holder made from fabric and releasable hook and loop fastening means sewn onto said card holder and onto said fabric wrap for releasably securing said card holder to said wrap.

5. A reusable article according to claim 4 wherein said fabric card holder is formed of a rectangular length of fabric folded at its center parallel to its shorter edges and formed with pockets at both of its ends adjacent to said shorter edges to capture the edges of a folding card placed therewithin.

6. A reusable gift wrapping comprising an expanse of quilted fabric having opposite surfaces and having overlock stitches of thread extending about its entire perimeter and said expanse of fabric is unfoldable to a flat disposition to define a cruciform having sets of pairs of foldable flaps wherein said flaps in each pair are directed in mutually opposing directions and said pairs of flaps reside in mutually perpendicular disposition relative to each other when said flaps are unfolded, and wherein said flaps in each pair are equipped with mutually engageable hook and loop fastening means formed by separable mating contact elements, one permanently secured to each of said flaps, and said flaps are foldable such that said mating contact elements in each of said pairs of flaps are engageable with each other to selectively and alternatively hold one of said opposite surfaces as an outer exposed surface and the other of said opposite surfaces as an inner concealed surface.

7. A reusable gift wrapping according to claim 6 wherein said mating contact elements are comprised of pairs of mating strips, one of which bears a multiplicity of minute flexible hooks projecting therefrom and the other of which bears a looped fabric pile, and said strips in each pair are mutually interengagable with each other.

8. A reusable gift wrapping according to claim 7 wherein a first of said flaps in each pair is foldable over the other and has at least one of said strips on its concealed surface and the other of said flaps in each pair has a mating strip on its exposed surface for each strip on said first flap.

9. A reusable gift wrapping according to claim 6 further comprising a fabric bow removably attached to said flat expanse of foldable fabric.

10. A reusable gift wrapping according to claim 6 further comprising a fabric card holder removably attached to said flat expanse of fabric.

* * * * *